United States Patent [19]

Houser et al.

[11] Patent Number: 4,669,044
[45] Date of Patent: May 26, 1987

[54] HIGH SPEED DATA TRANSMISSION SYSTEM

[75] Inventors: James S. Houser; Frank Hines, both of Cambridge, Ohio

[73] Assignee: NCR Corporation, Dayton, Ohio

[21] Appl. No.: 627,310

[22] Filed: Jul. 2, 1984

[51] Int. Cl.$^4$ .............................................. G06F 3/04
[52] U.S. Cl. .................................................. 364/200
[58] Field of Search ............................. 364/200, 900

[56] References Cited

U.S. PATENT DOCUMENTS

| | | | |
|---|---|---|---|
| 3,638,195 | 4/1970 | Brender et al. | 364/200 |
| 4,212,080 | 7/1980 | Milliken | 364/900 |
| 4,293,909 | 10/1981 | Catiller et al. | 364/200 |
| 4,298,928 | 10/1978 | Etoh et al. | 364/200 |
| 4,375,078 | 3/1981 | Thoma | 364/200 |
| 4,376,982 | 6/1980 | Bantz et al. | 364/900 |
| 4,433,391 | 8/1981 | Potash | 364/900 |
| 4,455,622 | 3/1982 | Loskorn et al. | 364/900 |
| 4,488,226 | 11/1982 | Wagner, Jr. et al. | 364/200 |

OTHER PUBLICATIONS

Bhatt et al., Compcon 79, 19th IEEE Computer Society Int. Conference, 1979, "Communications in a Hierarchial Multicomputer", pp. 374–379.

Floyd, "Digital Fundamentals", 1982, pp. 246–252.

*Primary Examiner*—Eddie P. Chan
*Assistant Examiner*—Randy W. Lacasse
*Attorney, Agent, or Firm*—Wilbert Hawk, Jr.; Albert L. Sessler, Jr.; Richard W. Lavin

[57] ABSTRACT

A method and apparatus for transferring data between two data processors includes transferring a data byte from the first processor to a latch member, setting a flip-flop circuit which generates an interrupt signal to the second processor enabling the second processor to transfer the data byte from the latch member to a RAM memory unit associated with the second processor. The second processor resets the flip-flop circuit which outputs a signal to the first processor enabling the first processor to transfer another data byte to the latch member. Steering address bits associated with each of the processors are used to provide control signals to select the storage member in which the data bytes are to be transferred. A second flip-flop circuit associated with the second processor allows the second processor to transfer data to the first processor in the same manner.

4 Claims, 9 Drawing Figures

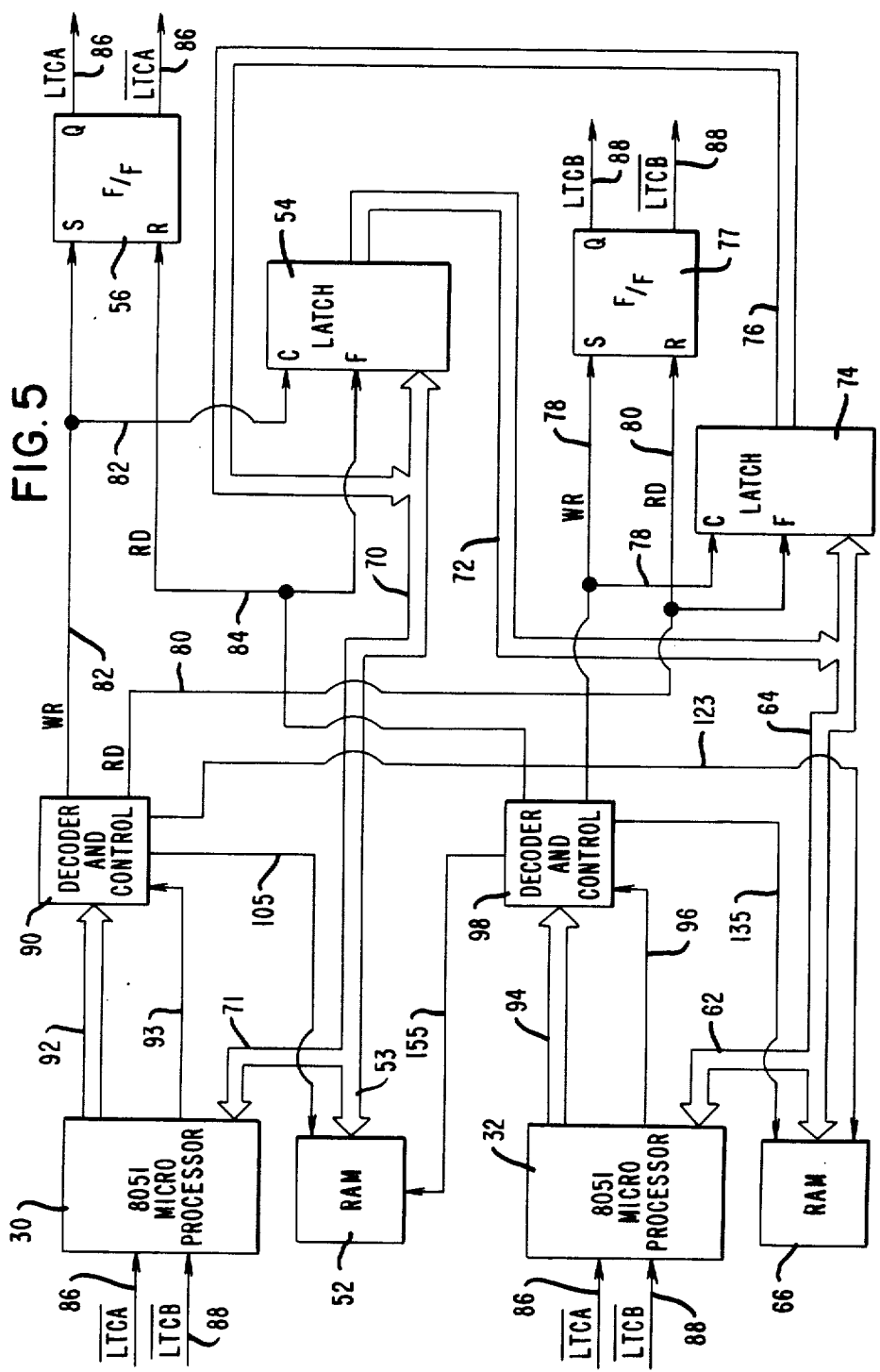

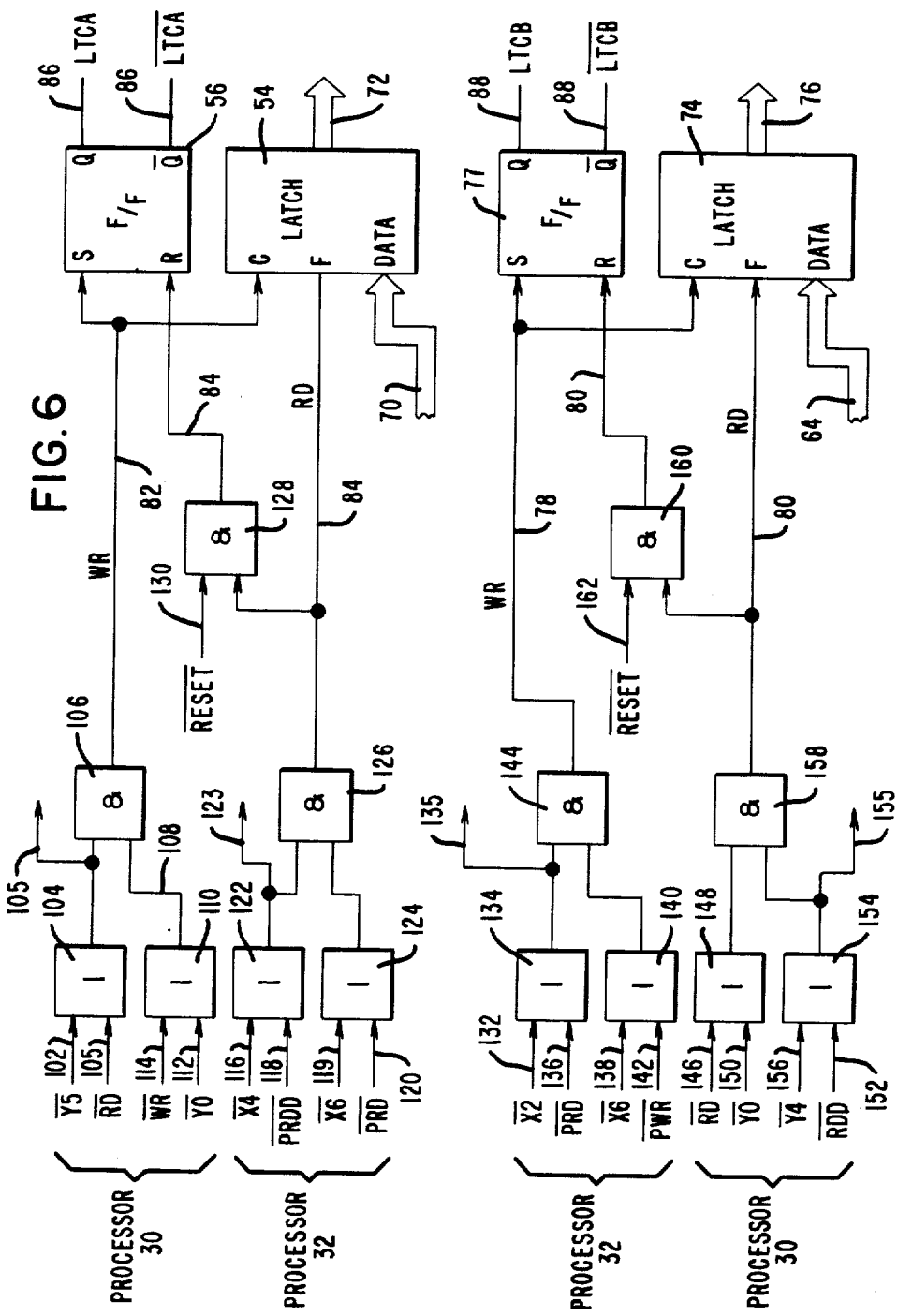

HIGH SPEED DATA TRANSMISSION SYSTEM

BACKGROUND OF THE INVENTION

The present invention relates to a data processing system and, more particularly, to a system for transmitting data between a pair of processors at a high transmission rate.

Prior art data transmission systems in which data is transferred between two processors have required the transmission of some type of acknowledgment or handshake signals by the receiving processor indicating the receipt of the data sent, enabling the sending processor to continue transmitting the next data byte. As the number of processors in the system increases, the time it takes to transmit data between the processors increases. In the case of data terminal devices where each operating portion (keyboard, display, printer, etc.) contains a microprocessor, the time it takes for data to be transmitted from a master or a remote processor to a microprocessor located in a data terminal device becomes critical to the operating efficiency of the overall data processing system.

It is therefore a principal object of this invention to provide an improved system for transferring data between two data processors. It is a further object of this invention to provide a system for transmitting data between processors at a high rate of speed. It is another object of this invention to provide a system for transferring data between two data processors which is transparent to both processors and which is simple in its construction; therefore, low in cost.

SUMMARY OF THE INVENTION

In order to fulfill these objects, there is disclosed a system for transmitting data between two processors in which each processor is coupled to a latch for storing a data byte which is to be transferred directly to the RAM memory associated with the other processor. A bistable device such as a flip-flop integrated circuit associated with each of the latches is set by the sending processor when data that is to be transferred is stored in the latch member associated with the sending processor. The setting of the flip-flop circuit generates an interrupt signal to the receiving processor enabling the receiving processor to generate address control signals for transferring the byte of data stored in the latch member associated with the sending processor to a memory location in the memory associated with the receiving processor. The control signal generated also resets the flip-flop circuit resulting in a signal being generated and transmitted to the sending processor enabling the sending processor to store the next byte of data in the latch member. This process is repeated if the receiving processor is required to send data to the sending processor using a latch member and a flip-flop circuit associated with the receiving processor. Steering bits associated with the control signals steer the data to the storage location in the latch member and the memory.

BRIEF DESCRIPTION OF THE DRAWING

Additional advantages and features of the present invention will become apparent and fully understood from the reading of the following description, taken in conjunction with the annexed drawings, in which;

FIG. 5 is a more detailed block diagram of the communication controller of FIG. 3.

FIG. 6 is a logic diagram of the control portion of the address decoder and control blocks 90 and 98 of FIG. 5.

DESCRIPTION OF THE PREFERRED EMBODIMENT

It should be noted at this time that, throughout this description of the preferred embodiment, the presence of a slash (/) following either a symbol or an acronym represents the logical inversion of that symbol or acronym.

Figure 1:
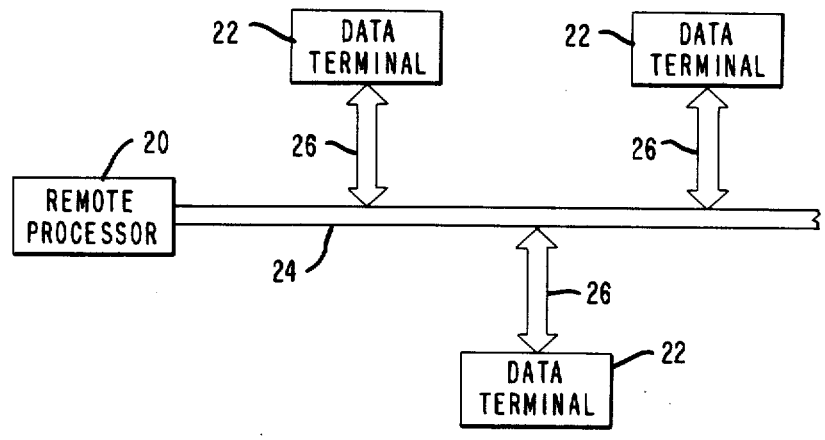
FIG. 1 is a schematic diagram of a multi-point data processing system including a remote processor connected to a plurality of data terminal devices in which the present invention may be used.
Figure 2:
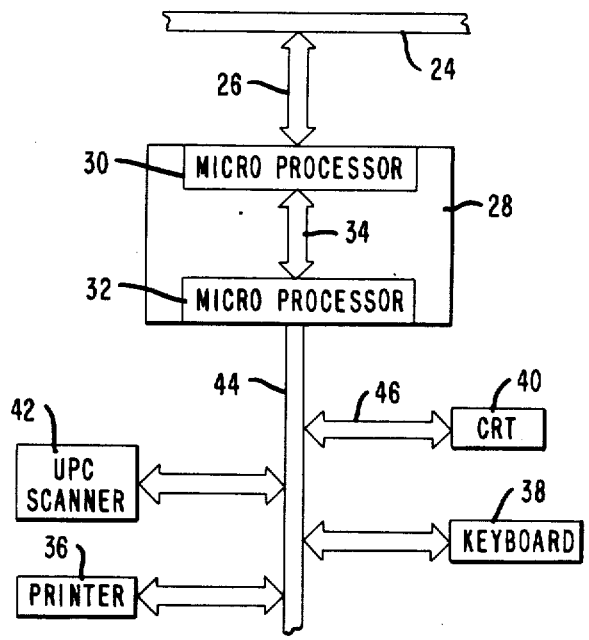
FIG. 2 is a schematic diagram of the communication bus of each of the data terminals of FIG. 1 showing the microprocessor arrangement of the communication controller located therein.
Figure 4A:
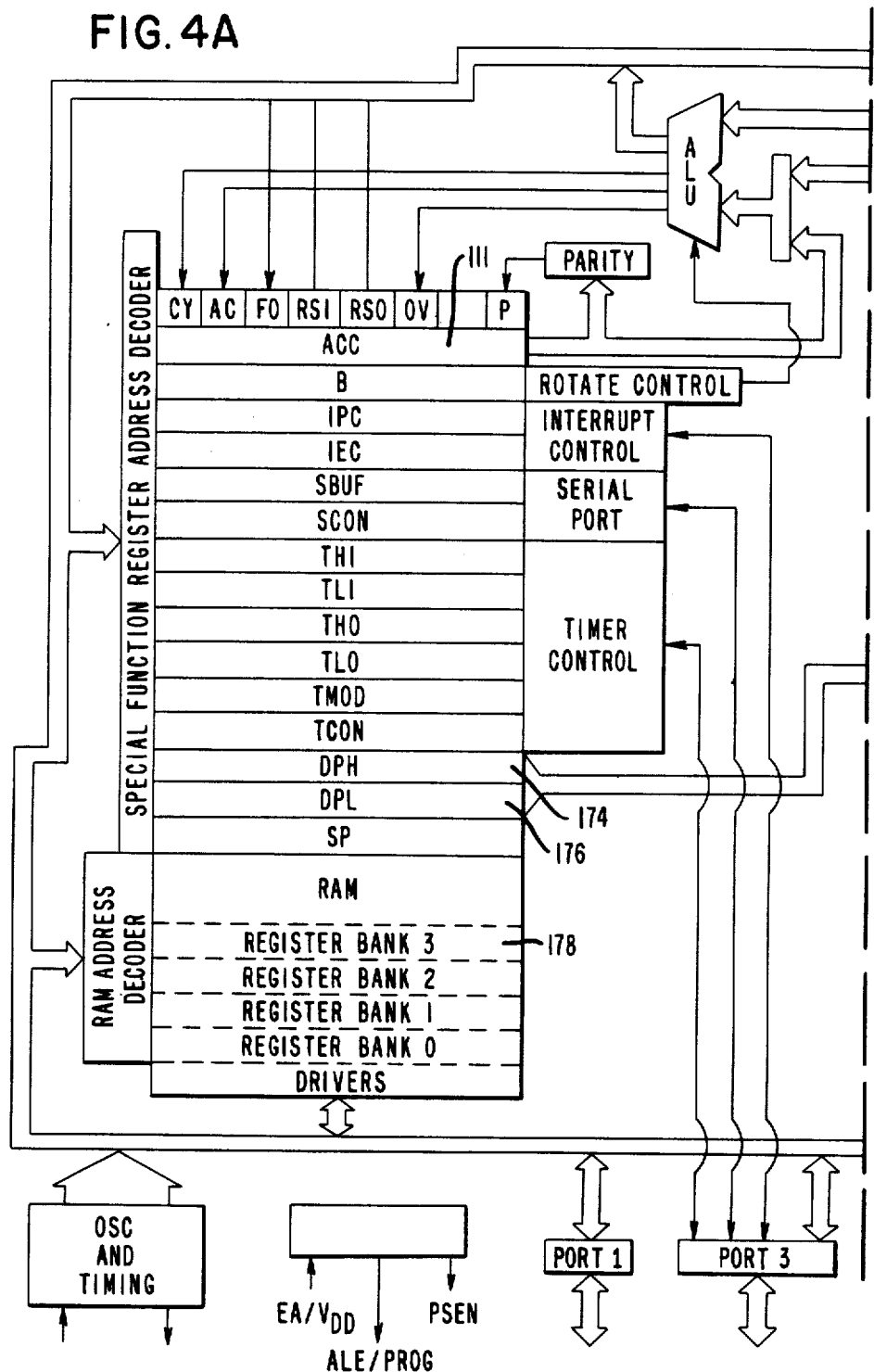
FIGS. 4A and 4B taken together disclose a block diagram of the microprocessors found in the communication controller of FIG. 3.
Figure 4B:
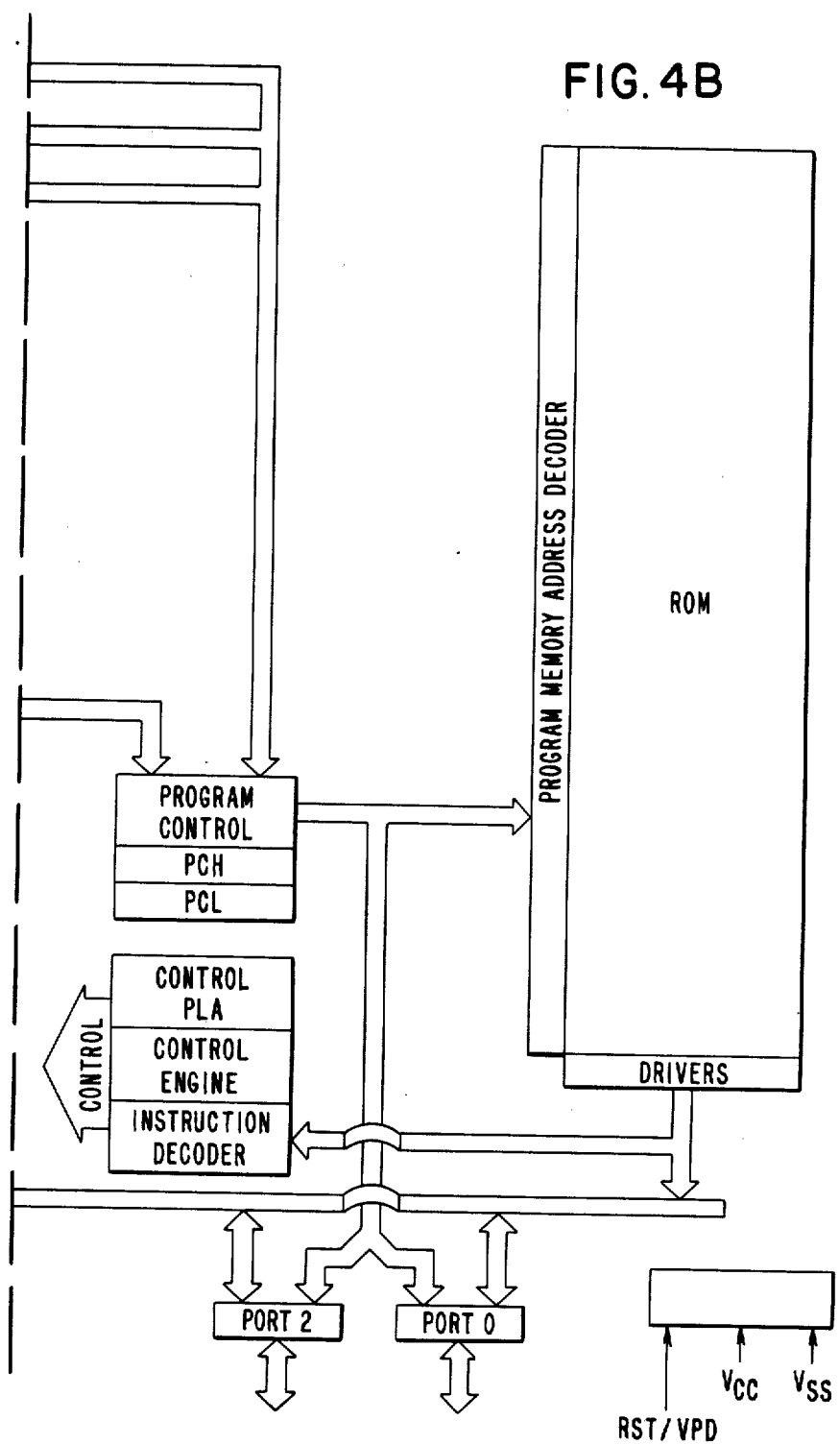

Referring to FIG. 1, there is shown a schematic diagram of a typical multi-point data processing system forming a local area communication network which may include a remote central processor 20 and a plurality of data terminal devices connected to the processor 20 by a serial communication bus 24 and a serial sub-system transfer bus 26 over which data is transmitted between the processor 20 and the terminal devices 22 in a manner that is well known in the art. As shown in FIG. 2, the data appearing on the buses 24 and 26 are inputted into a communication interface unit or controller 28 located in each of the terminal devices 22. Included in the controller 28 are a pair of microprocessor units 30, 32 interconnected by a serial communication bus 34. As is well known in the art, the controller 28 functions to control the data flow between the remote processor 20 and the various operating portions of the terminal devices such as a printer 36, a keyboard 38, a CRT display 40 and a UPC scanner 42. The data is transmitted between the controller 28 and the various operating portions of the terminal device over the buses 44 and 46. The microprocessors 30, 32 referred to herein may comprise the Intel 8051 which is commercially available from the Intel Corporation of Santa Clara, Calif. A schematic diagram of the microprocessors 30, 32 is shown in FIGS. 4A and 4B. A description of the Intel 8051 may be found in the publication "MCS-51 Family of Single Chip Microcomputer User's Manual" published by the Intel Corporation in July, 1981. However, it should be realized that the invention could readily be adapted for use with a different type of microprocessor or processor and that such other uses lie within the purview of the invention.

Figure 3:
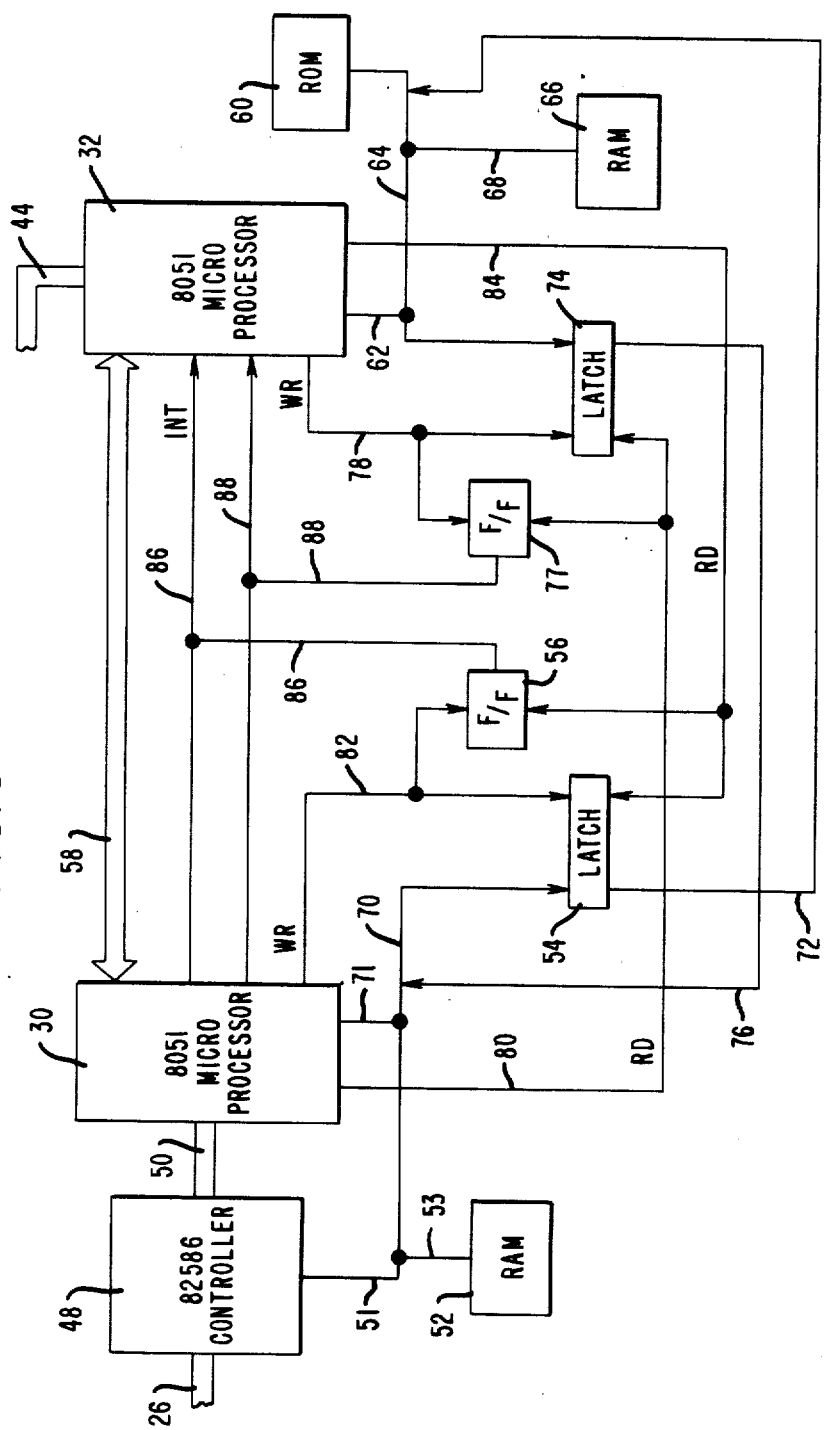
FIG. 3 is a partial block diagram of the communication controller of FIG. 2 illustrating the present invention.

Referring now to FIG. 3, there is shown a partial block diagram of the controller 28 (FIG. 2). Included in the controller is an Intel 82586 control unit 48 which, when receiving data over the bus 26, checks to see if the data is designated for the terminal device associated with the control unit. Unless otherwise noted, all designated integrated circuit elements are commercially available from the Texas Instrument Corporation of Dallas, Tex. The data received by the control unit 48 over bus 26 is transferred over buses 51 and 53 to a RAM memory unit 52 for storage therein. Associated via buses 70 and 71 with the microprocessor 30 is a 74LS374 eight bit latch member 54 for storing one byte of data and a 74LS74 flip-flop circuit 56. The microprocessor 30 is connected over control bus 58 to the microprocessor 32 which in turn is connected to a ROM memory unit 60 and a RAM memory unit 66 over buses 62, 64 and 68. As will be explained more fully hereinafter, data stored in the RAM memory unit 52 or in the microprocessor 30 is transferred over bus 70 to the latch member 54 from where it is transferred to the RAM memory unit 66 and the microprocessor 32 over buses 72, 64, 62 and 68. In a similar manner, data stored in either the microprocessor 32 or the RAM memory unit 66 is transferred to a 74LS74 latch member 74 and then to the RAM memory and the microprocessor 30 over buses 76, 70, 71 and 53.

Associated with the microprocessor 32 is a 74LS74 flip-flop integrated circuit 77 controlled by a write signal WR outputted from the microprocessor 32 over line 78 and a read signal RD outputted from the microprocessor 30 over line 80 for enabling the microprocessors 30, 32 to transfer data between the RAM memory units 52, 66 at a high rate of speed. In a similar manner, the flip-flop circuit 56 is controlled by a write signal WR appearing on line 82 from the microprocessor 30 and a read signal RD appearing on line 84 outputted by the microprocessor 32. Switching of the flip-flop circuit 56 results in a signal being transmitted over line 86 to the microprocessors 30, 32 while a similar signal is outputted over line 88 upon the operation of the flip-flop circuit 77.

Referring now to FIG. 5, there is disclosed a more detailed block diagram of FIG. 3 which includes an address decoder and control unit 90 which receives from the microprocessor 30 over bus 92 three address bits used to steer the data appearing on the data buses 70, 71 and 76 to the RAM memory unit 52 for which the data is intended. The microprocessor 30 also outputs a read or write control signal over line 93 to the decoder and control unit 90. The control unit 90, in response to receiving the steering bits over bus 92 and a read or write signal on line 93 will output the write signal WR over line 82 to the set input of the flip-flop circuit 56 setting the flip-flop circuit to output the signal LTCA/ over line 86 to the microprocessors 30 and 32. The signal WR will also enable the latch member 54 to receive the data bits appearing on the data bus 70 from the RAM memory unit 52. As will be described more fully hereinafter, data stored in the microprocessor 30 may also be transferred over bus 71 to the latch 54 for transfer to the RAM memory unit 66 and the microprocessor 32 over bus 64. The signal LTCA/, transmitted to the microprocessors 30 and 32 over line 86 and acting as an interrupt signal, notifies the microprocessor 32 of the availability of the data byte stored in the latch member 54. The microprocessor 32, in response to receiving the signal LTCA/, will output a read signal RD over line 84 (FIGS. 3, 5 and 6) to the latch member 54 enabling the latch member to output the stored data bits over buses 72 and 64 (FIG. 5) for storage in the RAM memory unit 66 and the microprocessor 32 while resetting the flip-flop circuit 56. As will be described more fully hereinafter, the signal RD outputted by the microprocessor 32 is the result of decoding the steering address bits selecting the latch member 54 from which the data is to be read.

In a similar manner, the microprocessor 32 will output steering address bits over bus 94 (FIG. 5) and a read or write control signal over line 96 to an address decoder and control unit 98 when data bits stored in the RAM memory unit 66 are required to be transmitted to the RAM memory unit 52. In response to receiving the steering address bits over bus 94, the control unit 98 outputs the write signal WR over line 78 to the flip-flop circuit 77 setting the flip-flop circuit which results in the signal LTCB/ being transmitted over line 88 to the microprocessors 32 and 30. The WR signal appearing on line 78 also clocks the latch 74 to receive the data bits transferred from the RAM unit 66 over bus 64. In response to receiving the signal LTCB/, the microprocessor 30 will output a read signal RD over line 80 (FIGS. 3 and 5) to the latch member 74 enabling the latch member to output the stored data bits over buses 76, 70 and 71 to the RAM memory unit 52 and the microprocessor 30 while resetting the flip-flop circuit 77.

Referring now to FIG. 6, there is shown a portion of the logic circuit located in the decoder and control units 90, 98 (FIG. 5). As previously described, the microprocessor 30 (FIG. 3) receives data over the bus 26 which is stored in the RAM memory unit 2. The data stored in the memory unit is to be transferred to the RAM memory unit 66 (FIG. 5) from where it is to be transferred to one of the microprocessors 32 associated with one of the operating portions 38–42 inclusive (FIG. 2) of the data terminal devices 22 (FIG. 2). When the microprocessor 30 is to transfer the data stored in the RAM memory unit 52 to the RAM memory unit 66 associated with the microprocessor 32, the microprocessor 30 will output the three address bits of the hexadecimal sixteen address bits B800-BFFF stored in the data pointer registers 174, 176 (FIG. 4A) of the microprocessor 30, representing the address in the RAM memory unit 52 at which the data is stored. The lower eight bits of the address bits stored in the low pointer register 176 (FIG. 4A) are outputted over Port 0 (FIG. 4B) to the RAM memory unit 52 while the upper eight bits of the address bits stored in the high pointer register 174, including the three steering bits, are outputted over Port 2. The address bits are outputted over buses 71 and 70 to the RAM memory unit 52 from the microprocessor 30. The RAM address is determined by the eleven least significant address bits while three of the remaining 5 bits comprising steering bits for selecting the memory unit in which a read or write operation is to occur. In response to receiving the three steering bits, the decoder portion of the control unit 90 will output the decoded signal Y5/ into one input of an OR gate 104 (FIG. 6). The output signals of the gate 104 are inputted into one input of an AND gate 106 which also receives over line 108 the output signals of an OR gate 110. The signals outputted by the gate 104 are also transferred over line 105 (FIGS. 5 and 6) as read enable signals to the RAM memory unit 52 enabling the unit to output data over bus 70 to the latch memb $\cdot$ 54. An OR gate 110 receives over line 112 the decode signal YO/ representing the steering bits of the hex decimal address bits 0000-1FFF defining the location of data stored in the accumulator 111 (FIG. 4A) of the microprocessor 30 which is to be written into the latch member 54 for transfer to the memory unit 66 or the microprocessor 32. The OR gate 110 will also receive the write signal WR/ over line 114 which is transmitted to the control unit 90 over line 93 (FIG. 5) from the microprocessor 30. The AND gate 106 will gate the write signal WR over line 82 clocking the latch member 54 to store the data bits appearing on bus 70 and setting the flip-flop circuit 56 to output the signal LTCA/ over line 86 to the microprocessor 32 indicating the storing of data in the latch member 54.

In response to the generation of the signal LTCA/, the microprocessor 32 will output over bus 94 to the control unit 98 (FIG. 5) the steering bits of the hexadecimal address bits 8000-97FF representing the storage address in the RAM memory unit 66 (FIG. 3) at which the data stored in the latch member 54 is to be transferred. In response to receiving the steering bits, the decoder portion of the control unit will output the decoded signal X4/(FIG. 6) over line 116 to one input of an OR gate 122. The OR gate 122 will also receive the read signal PRDD/ over line 118. If data is to be transferred to the accumulator 111 (FIG. 4A) of the microprocessor 32, the decoded signal X6/ will appear on the input line 119 of an OR gate 124 representing the steering bits of the hexadecimal address bits C000-DFFF. The read signal PRD/ will appear on the input line 120. The signal outputted by the OR gate 122 during a read operation by the microprocessor 32 is inputted into an AND gate 126 which also receives the output signal from the OR gate 124. The signals outputted by the OR gate 122 are also transferred over line 123 (FIGS. 5 and 6) to the RAM memory unit 66 as write enable signals enabling the RAM unit 66 to store the data appearing on the bus 64. The read signal RD is outputted by the AND gate 126 over line 84 to the latch member 54 and enables the latch member to output the data stored in the latch member over bus 72 to the RAM memory unit 66 and the microprocessor (FIG. 3) for storage therein. The RD signal is also inputted into the AND gate 128 which also receives the system RESET/ signal appearing on line 130 to output a RESET signal to the flip-flop circuit 6, resetting the flip-flop circuit which outputs the signal LTCA/ over line 86 to the microprocessor 30 (FIG. 5) notifying the microprocessor that the latch member 54 is available for the storage of the next data byte to be transmitted to the microprocessor 32 or to the RAM memory unit 66.

When the microprocessor 32 has data stored in the RAM memory unit 66 that is to be transferred to the microprocessor 30, the microprocessor 32 will output the steering signals of the sixteen address bits 4000-57FF in which the thirteen least significant bits of the address bits represent the address to be accessed in the RAM memory unit 66 from which the data is to be transferred to the latch member 74. In response to receiving the steering bits, the decoder portion of the control unit 98 (FIG. 5) will output the decoded signal X2/(FIG. 6) over line 132 to an OR gate 134 which also receives the read signal PRD/ over line 136. As described previously, the steering bits are used to steer the data from the storage area in the RAM memory unit 66 to the latch member 74. The output signal of the OR gate 134 is transferred over line 135 (FIGS. 5 and 6) to the RAM memory unit 66 as read enable signals enabling the RAM unit 66 to output data over bus 64. When the data to be transferred to the latch member 74 is stored in the accumulator 111 (FIG. 4A) of the microprocessor 32, the microprocessor 32 will output the steering bits of the address bits C000-DFFF resulting in the appearance of the decoded signal X6/ on line 138 to an OR gate 140 which also receives the write signal PWR/ over line 142. The output signals of the OR gates 134 and 140 are inputted into an AND gate 144 which outputs a write signal WR over line 78 clocking the latch member 74 to store the data appearing on the bus 64 and also setting the flip-flop circuit 77 which outputs the signal LTCB/ over line 88 to the microprocessor 30 (FIG. 5) for notifying the microprocessor of the data stored in the latch member 74.

In response to receiving the signal LTCB/, the microprocessor 30 will output the read signal RD/ over line 93 (FIG. 5) to the control unit 90 where it is transmitted over line 146 to an OR gate 148 (FIG. 6) when the data stored in the latch member 74 is to be transferred to the accumulator 111 (FIG. 4A) of the microprocessor 30. The microprocessor 30 will also output the steering signals Y0/ of the address bits 0000-1FFF resulting in the appearance of the signal Y0/ on line 150 for transmission to the OR gate 148 in the control unit 90. Where the data is to be transferred from the latch member 74 (FIG. 3) to the RAM memory unit 52, the microprocessor 30 will output the read signal RDD/ which is transmitted over line 152 to an OR gate 154 and the steering signals of the address bits 9800-9FFF resulting in the appearance of the signal Y4/ on line 156. The address in the RAM memory unit 52 in which the data is to be stored is determined by the eleven least significant bits of the address bits with three of the remaining bits acting as steering bits to steer the data into the RAM memory unit 66 as previously described. The output signal of the OR gate 154 is transmitted over line 155 (FIGS. 5 and 6) as write enable signals to the RAM memory unit 52 enabling the RAM unit to store the data bits appearing on buses 70 and 53. The output signals of the OR gates 148, 154 are inputted into an AND gate 158 which outputs the read signal RD over line 80 to the latch member 74, enabling the latch member to output the stored data bits over bus 76 to both the accumulator 111 (FIG. 4A) of the microprocessor 30 and the RAM memory unit 52 (FIG. 5) in the manner described previously. The signal RD outputted by the AND gate 158 is also inputted into one side of an AND gate 160 which also receives a system reset signal RESET/ over line 162. The output signal of the AND gate 160 will reset the flip-flop circuit 77 whose output signal LTCB/ appearing on line 88 will notify the microprocessor 32 (FIG. 5) of the availability of the latch member 74 for the storage of the next data byte which is to be transferred to the microprocessor 32.

Figure 7:
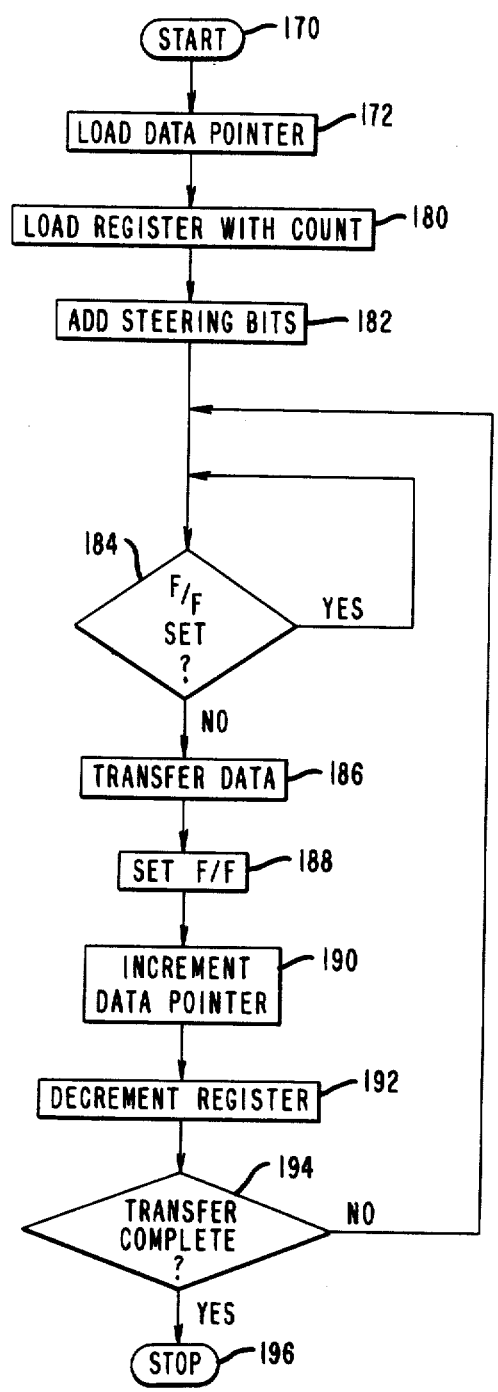
FIG. 7 is a flow chart of the operation of the sending processor in transmitting data between two processors employing the present invention.

Referring now to FIG. 7, there is disclosed a flow chart of the operation for transferring data from the microprocessor 30 to the microprocessor 32. The microprocessor 30 will start (Block 170) by loading (Block 172) the 8-bit registers DPH 174 (FIG. 4A) and DPL 176 with the address in the RAM memory unit 52 where the data byte that is to be transferred is stored. The microprocessor 30 will then load (Block 180) one of the registers 178 (FIG. 4A) with a count of the data bytes that are to be transferred and add the steering bits (Block 182) to the address stored in the registers 174, 176 for locating the storage area in the latch member 54 (FIG. 3) in which the data byte stored in the RAM memory unit 52 is to be transferred. The microprocessor 30 then checks to see if the flip-flop circuit 56 (FIG. 3) is in a set condition (Block 184) by checking the signal level appearing on line 86 (FIG. 3). If the flip-flop circuit 56 is set indicating that the latch member 54 is full, the microprocessor will continue checking the state of the flip-flop circuit 56 until it finds the flip-flop circuit in a RESET condition. At that time, the microprocessor 30 will generate the read signal RD/ (FIG. 6) and the RAM address and steering bits for transferring (Block 186) a data byte from the RAM memory unit 52 (FIG. 3) to the latch member 54 and set the flip-flop circuit 56 (Block 188) (FIGS. 3 and 6). The microprocessor will then increment the data pointer address bits stored in the registers 174, 176 (Block 190), decrement the count stored in the register 178 (Block 192) and then check the output count of the register 178 to determine if the transfer of the data is completed (Block 194). If the transfer is complete, the microprocessor 30 will stop (Block 196) the transfer operation.

As previously described, prior to the transfer operation, the microprocessor 30 will have sent through the latch 54 a count to the microprocessor 32 (FIG. 6) representing the number of character bytes to be transferred. The microprocessor 32 in response to receiving the count will start (Block 198) (FIG. 8) the transfer operation by loading (Block 200) the data pointer bits in the registers 174, 176 (FIG. 4A) of the microprocessor 32 representing the address in the RAM memory unit 66 (FIG. 6) where the transferred data is to be stored. The microprocessor 32 will then load (Block 202) the count of the data bytes to be transferred in the register 178, add steering bits (Block 204) to the data pointer address stored in the registers 174, 176 (FIG. 4A) and check to see if the flip-flop circuit 56 (Block 206) is in a RESET condition. If the flip flop circuit 56 is in a RESET condition, indicating that the latch member 54 does not contain data to be transferred, the microprocessor will cycle until it detects the flip-flop circuit 56 in a set condition. The microprocessor 32 will then generate the read signal PRDD/ (FIG. 6) and the required address and steering bits which transfers (Block 208) the data from the latch member 54 to the RAM memory unit 66 and resets the flip-flop circuit 56 (FIGS. 3 and 6) (Block 210). The microprocessor 32 increments (Block 212) the data pointer address bits stored in the registers 174, 176 (FIG. 4A), decrements the count (Block 214) stored in the register 178 and checks (Block 216) the output of the register 178 to determine whether the transfer of the data is completed. If it is not completed, the transfer of the next data byte is started. This transfer operation will continue until the output count of the register 178 is zero indicating that the transfer has been completed, at which time the processor 32 will stop (Block 218) the transfer operation.

The following comprises a detailed listing for the data transfer operation between the microprocessors 30 and 32. The actual machine codes and instructions relate to the Intel 8051 microprocessor chip in the embodiment described, however, the techniques employed herein may be extended to other processors. Definitions of the various machine codes and instructions may be obtained from, for example, a publication entitled "8051 User's Manual" which was published by the Intel Corporation in 1982.

| LOCATION | OBJECT | SOURCE |
|---|---|---|
| HOLD | BIT | P3.3 |
| HLDA | BIT | P1.0 |
| CA | BIT | P1.1 |
| LOOP | BIT | P1.6 |
| READY_TO | BIT | P1.2 |
| READY_FROM | BIT | P1.3 |

-continued

| LOCATION | OBJECT | SOURCE |
|---|---|---|
| TIME_HI EQU | 9EH | |
| TIME-LO EQU | 58H | |
| NUM_TIMERS | EQU | :04 |
| TMOUT_INIT | EQU | 81H |
| TMOUT_SCB | EQU | 82H |
| TMOUT_CBL | EQU | 83H |
| TMOUT_LINK_XMIT | EQU | 86H |
| LOOP1_FAILED | EQU | 85H |
| BAD_CID | EQU | 87H |
| $EJECT | | |
| MULTI_BYTE: | | |
| | JNB | READY_TO, MULTI_BYTE |
| | MOV | A,DPH |
| | ANL | A,#0FH |
| | ORL | A,#0BCH |
| | MOV | DPH,A |
| | MOVX | A,@DPTR |
| | INC | DPTR |
| SEND_DA: | | |
| | JNB | READY_TO,SEND_DA |
| | MOVX | A,@DPTR |
| | INC | DPTR |
| SEND_LENGTH: | | |
| | JNB | READY_TO, SEND_LENGTH |
| | MOVX | A,@DPTR |
| | JZ | MBR |
| | MOV | R6,A |
| | INC | DPTR |
| SEND_DATA: | | |
| | JNB | READY_TO, SEND_DATA |
| | MOVX | A,@DPTR |
| | INC | DPTR |
| | DJNZ | R6,SEND_DATA |
| MBR: | | |
| | RET | |
| ;TWO_BYTE: | | |
| ;JNB | | READY_TO,TWO_BYTE |
| ;MOV | | DPTR,#0000 |
| ;MOV | | A,R6 |
| ;MOVX | | @DPTR,A |
| ;SEND_ONE: | | |
| ;JNB | | READY_TO,SEND_ONE |
| ;MOV | | A,R7 |
| ;MOVX | | @DPTR,A |
| ;RET | | |
| IN_FROM_IOM: | | |
| | MOV | A,DPH |
| | ANL | A,#0FH |
| | ORL | A,#90H |
| | MOV | DPH,A |
| | MOVX | A,@DPTR |
| | IN | DPTR |
| | JZ | ERROR_DEC |
| | CJNE | A,#01,CHECK2 |
| | JMP | TWO_155 BYTES_IN |
| CHECK2: | | |
| | CJNE | A,#02,CHECK3 |
| | RET | |
| CHECK3: | | |
| | CJNE | A,#03,CHECK4 |
| | JMP | MULTI_BYTE_IN |
| CHECK4: | | |
| | CJNE | A,#04,CHECK5 |
| | JMP | MULTI_BYTE_IN |
| CHECK5: | | |
| | CJNE | A,#05,CHECK6 |
| | RET | |
| CHECK6: | | |
| | CJNE | A,#06,CHECK7 |
| | JMP | MULTI_BYTE_IN |
| CHECK7: | | |
| | CJNE | A,#07,ERROR_DEC |
| | JMP | TWO_BYTES_IN |
| ERROR_DEC: | | |
| | RET | |
| TWO_BYTES_IN: | | |
| | JB | READY_FROM. |

| LOCATION | OBJECT | SOURCE |
|---|---|---|
| | MOVX | TWO_BYTES_IN A@LPTR |
| | RET | |
| MULTI_BYTE_IN: | | |
| | JB | READY_FROM, MULTI_BYTE_IN |
| | MOVX | A,@DPTR |
| | INC | DPTR |
| GET_LENGTH_UP: | | |
| | JB | READY_FROM, GET_LENGTH_UP |
| | MOVX | A,@DPTR |
| | JZ | GO_BACK |
| | MOV | R6,A |
| | INC | DPTR |
| GET_DATA: | | |
| | JB | READY_FROM, GET_DATA |
| | MOVX | A,@DPTR |
| | INC | DPTR |
| | DJNZ | R6,GET_DATA |
| GO_BACK: | | |
| | RET | |
| $EJECT | | |
| SET_NO_BUFF: | | |
| | SETB | NO_BUFF |
| | JMP | GO_BACK2 |
| INPUT_FROM_UPPER_IOM: | | |
| | CLR | EXO |
| EXONTR: | CLR | IEO |
| | PUSH | PSW |
| | MOV | PSW,#BANK_2 |
| | MOV | R3,A |
| | MOV | R4,DPH |
| | MOV | R5,DPL |
| | MOV | DPTR, #SAVE_REGS_INT |
| | MOV | A,R3 |
| | MOVX | @DPTR,A |
| | INC | DPTR |
| | MOV | A,R4 |
| | MOVX | @DPTR,A |
| | INC | DPTR |
| | MOV | A,R5 |
| | MOVX | @DPTR,A |
| | INC | DPTR |
| | MOV | A,SP |
| | MOVX | @DPTR,A |
| IN_FROM_LAN: | | |
| | JB | POWERED_UP, CHK_UPPER |
| | MOV | DPTR,#0C000H |
| | MOVX | A,@DPTR |
| | CJNE | A,#80H,CHK_07 |
| | MOV | R6,#80H |
| GET_THE_REST: | | |
| | CALL | GET_LANIN_BUFF |
| | JZ | SET_NO_BUFF |
| | MOV | R1,DPH |
| | MOV | R0,DPL |
| | INC | DPTR |
| | MOV | A,R6 |
| | MOVX | @DPTR,A |
| | MOV | A,DPH |
| | ANL | A,#1FH |
| | ORL | A,#80H |
| | MOV | DPH,A |
| | INC | DPTR |
| | JMP | GET_LONG_MSG |
| CHK_UPPER: | | |
| | MOV | DPTR, #TIMER_PU_CHK |
| | CLR | A |
| | MOVX | @DPTR,A |
| | CLR | POWERED_UP |
| | MOV | DPTR,#SHORT_MESG |
| | MOV | A,DPH |
| | ANL | A,#1FH |
| | ORL | A,#80H |
| | MOV | DPH,A |
| | MOVX | A@DPTR |

| LOCATION | OBJECT | SOURCE |
|---|---|---|
| | CJNE | A,#81H, CHK_FATAL_FLT |
| | JMP | BRING_IN_81 |
| CHK_FATAL_FLT: | | |
| | CJNE | A,#0F0H, CHK_OTHER_CODES |
| | MOV | DPTR,#SHORT_MESG |
| | MOV | A,#0FOH |
| | MOVX | @DPTR,A |
| | JMP | TWO_BYTES |
| CHK_OTHER_CODES: | | |
| | MOV | DPTR,#SHORT_MESG |
| | MOVX | @DPTR,A |
| | INC | DPTR |
| | MOV | A,#0FFH |
| | MOVX | @DPTR,A |
| | JMP | NOT_LAN_MESS |
| CHK_07: | | |
| | CJNE | A,#07H, SHORT_MESS_IN |
| | MOV | R6,#07H |
| | JMP | GET_THE_REST |
| SHORT_MESS_IN: | | |
| | MOV | DPTR,#SHORT_MESG |
| | MOVX | @DPTR,A |
| | INC | DPTR |
| | JZ | LAN_ERR_IN |
| | JB | ACC.7,CHK_81 |
| CHK_01: | CJNE | A,#01H,CHK_02 |
| | JMP | TWO_BYTES |
| CHK_02: | CJNE | A,#02H,CHK_03 |
| | JMP | TWO_BYTES |
| CHK_03: | CJNE | A,#03,CHK_04 |
| | JMP | TWO_BYTES |
| CHK_04: | CJNE | A,#04H,CHK_05 |
| | JMP | BRING_IN_04 |
| CHK_05: | CJNE | A,#05H,CHK_06 |
| | JMP | TWO_BYTES |
| CHK_06: | CJNE | A,#06H,LAN_ERR_IN |
| | JMP | TWO_BYTES |
| CHK_81: | CJNE | A,#81H,CHK_82 |
| | JMP | LAN_ERR_IN |
| CHK_82: | CJNE | A,#82H,CHK_83 |
| | JMP | TWO_BYTES |
| CHK_83: | CJNE | A,#83H,CHK_FO |
| | JMP | BRING_IN_83 |
| CHK_FO: | CJNE | A,#0F0H,LAN_ERR_IN |
| | JMP | TWO_BYTES |
| GET_LONG_MSG: | | |
| | JB | P3.2,GET_LONG_MSG |
| | MOVX | A,@DPTR |
| | INC | DPTR |
| GET_LENGTH: | | |
| | JB | P3.2,GET_LENGTH |
| | MOVX | A,@DPTR |
| | JZ | LAN_ERR_IN |
| | MOV | R6,A |
| GET_POINTER: | | |
| | MOV | A,R7 |
| | JNZ | SECOND_BUFF |
| FIRST_BUFF: | | |
| | MOV | DPTR,#IN_DATA_0 |
| ADD_STEER: | | |
| | MOV | A,DPH |
| | ANL | A,#1FH |
| | ORL | A,#80H |
| | MOV | DPH,A |
| MULTI_BYTE: | | |
| | JB | P3.2,MULTI_BYTE |
| | MOVX | A,@DPTR |
| | INC | DPTR |
| | DJNZ | R6,MULTI_BYTE |
| | SJMP | SET_FULL |
| SECOND_BUFF: | | |
| | MOV | DPTR,#IN_DATA_1 |
| | SJMP | ADD_STEER |
| LAN_ERR_IN: | | |
| | MOV | DPTR,#SHORT_MESG |
| | INC | DPTR |
| | MOV | A,#0FFH |
| | MOVX | @DPTR,A |

-continued

| LOCATION | OBJECT | SOURCE |
|---|---|---|
| | JMP | PROC_LAN_ERRX |
| TWO_BYTES: | | |
| | JB | P3.2,TWO_BYTES |
| | MOV | A,DPH |
| | ANL | A,#1FH |
| | ORL | A,#80H |
| | MOV | DPH,A |
| | MOVX | A,@DPTR |
| | JMP | NOT_LAN_MESS |
| SET_FULL: | | |
| | MOV | DPH,R1 |
| | MOV | DPL,R0 |
| | MOVX | A,@DPTR |
| | ANL | A,#0FCH |
| | ORL | A,#02H |
| | MOVX | @DPTR,A |
| GO_BACK1: | | |
| | SETB | EXO |
| GO_BACK2: | | |
| | MOV | DPTR,#SAVE_REGS_INT |
| | MOVX | A,@DPTR |
| | MOV | R3,A |
| | INC | DPTR |
| | MOVX | A,@DPTR |
| | MOV | R4,A |
| | INC | DPTR |
| | MOVX | A,@DPTR |
| | MOV | R5,A |
| | INC | DPTR |
| | MOVX | A,@DPTR |
| | MOV | SP,A |
| | MOV | DPL,R5 |
| | MOV | DPH,R4 |
| | MOV | A,R3 |
| | POP | PSW |
| | RETI | |
| GET_LANIN_BUFF: | | |
| | JB | NEXT_TO_FILL,TEST_ONE |
| | MOV | R7,#0H |
| TEST_ZERO: | | |
| | MOV | DPTR,#IN_BUFF_STAT0 |
| TEST_BOTH: | | |
| | MOVX | A,@DPTR |
| | ANL | A,#03H |
| | JZ | FOUND_ONE |
| | CLR | A |
| | RET | |
| FOUND_ONE: | | |
| | CPL | NEXT_TO_FILL |
| | MOV | A,#01H |
| | MOVX | @DPTR,A |
| | RET | |
| TEST_ONE: | | |
| | MOV | DPTR,#IN_BUFF_STAT1 |
| | MOV | R7,#01H |
| | SJMP | TEST_BOTH |
| BRING_IN_81: | | |
| | JB | P3.2,BRING_IN_81 |
| | INC | DPTR |
| | MOVX | A,@DPTR |
| | INC | DPTR |
| GET_81_LENGTH: | | |
| | JB | P3.2,GET_81_LENGTH |
| | MOVX | A,@DPTR |
| | MOV | R6,A |
| | CJNE | A,#03H,WRONG_LN_81 |
| | INC | DPTR |
| GET_81_DATA: | | |
| | JB | P3.2,GET_81_DATA |
| | MOVX | A,@DPTR |
| | INC | DPTR |
| | DJNZ | R6,GET_81_DATA |
| | JMP | NOT_LAN_MESS |
| WRONG_LN_81: | | |
| | JMP | WRONG_LN_81 |
| BRING_IN_83: | | |
| | JB | P3.2,BRING_IN_83 |
| | MOV | A,DPH |
| | ANL | A,#1FH |
| | ORL | A,#80H |
| | MOV | DPH,A |
| | MOVX | A,@DPTR |
| | INC | DPTR |
| LENGTH_83: | | |
| | JB | P3.2,LENGTH_83 |
| | MOVX | A,@DPTR |
| | MOV | R6,A |
| | MOV | R7,#03H |
| | JZ | END_OF_XFER |
| LOOP_83: | | |
| | JB | P3.2,LOOP_83 |
| | MOVX | A,@DPTR |
| | INC | DPTR |
| | DJNZ | R7,TEST_LENGTH |
| | JMP | END_BUFF |
| TEST_LENGTH: | | |
| | DJNZ | R6,LOOP_83 |
| END_OF_XFER: | | |
| | SETB | GOT_PWRUP_MSG |
| | JMP | NOT_LAN_MESS |
| END_BUFF: | | |
| | DJNZ | R6,ON_THE_FLOOR |
| | JMP | END_OF_XFER |
| ON_THE_FLOOR: | | |
| | MOV | A,DPH |
| | ANL | A,#1FH |
| | ORL | A,#0C0H |
| | MOV | DPH,A |
| IN_THE_BUCKET: | | |
| | JB | P3.2,IN_THE_BUCKET |
| | MOVX | A,@DPTR |
| | INC | DPTR |
| | DJNZ | R6,IN_THE_BUCKET |
| | JMP | END_OF_XFER |
| BRING_IN_O4: | | |
| | JB | P3.2,BRING_IN_O4 |
| | MOV | A,DPH |
| | ANL | A,#1FH |
| | ORL | A,#80H |
| | MOV | DPH,A |
| | MOVX | A,@DPTR |
| | INC | DPTR |
| LENGTH_O4: | | |
| | JB | P3.2,LENGTH_O4 |
| | MOVX | A,@DPTR |
| | JNZ | LONGO4 |
| SHORT_O4: | | |
| | JMP | NOT_LAN_MESS |
| LONGO4: | | |
| | JMP | LONGO4 |
| SEND_ERFROG: | | |
| | JMP | SEND_ERR |
| SEND_UP_A: | | |
| | JB | SEND_IN_PROG,TRAN_NOT_COMPA |
| | MOV | DPTR,#UP_BUFF_STAT0 |
| | MOV | R5,#0 |
| SEND_UP_X: | | |
| | MOVX | A,@DPTR |
| | ANL | A,#0FH |
| | CJNE | A,#02H,SEND_ERFROG |
| | SETB | SEND_IN_PROG |
| | CALL | SAVE_DPTR1 |
| | MOVX | A,@DPTR |
| | RL | A |
| | MOVX | @DPTR,A |
| | INC | DPTR |
| | MOV | A,DPH |
| | ANL | A,#1FH |
| | ORL | A,#40H |
| | MOV | DPH,A |
| SEND_FUNCT: | | |
| | JNB | P1.2,SEND_FUNCT |
| | MOVX | A,@DPTR |
| | INC | DPTR |
| SEND_CSP: | | |
| | JNB | P1.2,SEND_CSP |

| LOCATION | OBJECT | SOURCE |
|---|---|---|
| | MOVX | A,@DPTR |
| | INC | DPTR |
| SEND_LENGTH: | | |
| | JNB | P1.2,SEND_LENGTH |
| | MOVX | A,@DPTR |
| | MOV | R6,A |
| | JZ | SET_COMPL |
| | MOV | A,R5 |
| | CJNE | A,#0,ONE_OR_TWO |
| BUFF_ZERO: | | |
| | MOV | DPTR, #UP_BUFF_DATA0 |
| | SJMP | SEND_DATA_UP |
| ONE_OR_TWO: | | |
| | CJNE | A,#1,TRY_BUFF2 |
| BUFF_ONE: | | |
| | MOV | DPTR, #UP_BUFF_DATA1 |
| | JMP | SEND_DATA_UP |
| TRY_BUFF2: | | |
| | MOV | DPTR, #UP_BUFF_DATA2 |
| SEND_DATA_UP: | | |
| | MOV | A,DPH |
| | ANL | A,#1FH |
| | ORL | A,#40H |
| | MOV | DPH,A |
| SEND_LOOP: | | |
| | JNB | P1.2,SEND_LOOP |
| | MOVX | A,@DPTR |
| | INC | DPTR |
| | DJNZ | R6,SEND_LOOP |
| SET_COMPL: | | |
| | CALL | GET_LAST_PTR |
| | MOVX | A,@DPTR |
| | RL | A |
| | MOVX | @DPTR,A |
| TRAN_COMP: | | |
| | RET | |
| TRAN_NOT_COMPA: | | |
| | JB | SEND_IN_PROG, TRAN_NOT_COMPA |
| | JMP | SEND_UP_A |
| SEND_UP_B: | | |
| | JB | SEND_IN_PROG, TRAN_NOT_COMPB |
| | MOV | DPTR, #UP_BUFF_STAT1 |
| | MOV | R5,#01H |
| | SJMP | SEND_UP_X |
| TRAN_NOT_COMPB: | | |
| | JB | SEND_IN_PROG, TRAN_NOT_COMPB |
| | JMP | SEND_UP_B |
| SEND_UP_U: | | |
| | JB | SEND_IN_PROG, TRAN_NOT_COMPU |
| | MOV | DPTR,#UP_BUFF_STATU |
| | MOV | R5,#02 |
| | JMP | SEND_UP_X |
| TRAN_NOT_COMPU: | | |
| | JB | SEND_IN_PROG, TRAN_NOT_COMPU |
| | JMP | SEND_UP_U |
| SAVE_DPTR1: | | |
| | MOV | R6,DPH |
| | MOV | R7,DPL |
| | MOV | DPTR, #SAVE_LAST_SENT |
| | MOV | A,R6 |
| | MOVX | @DPTR,A |
| | INC | DPTR |
| | MOV | A,R7 |
| | MOVX | @DPTR,A |
| | MOV | DPH,R6 |

Figure 8:
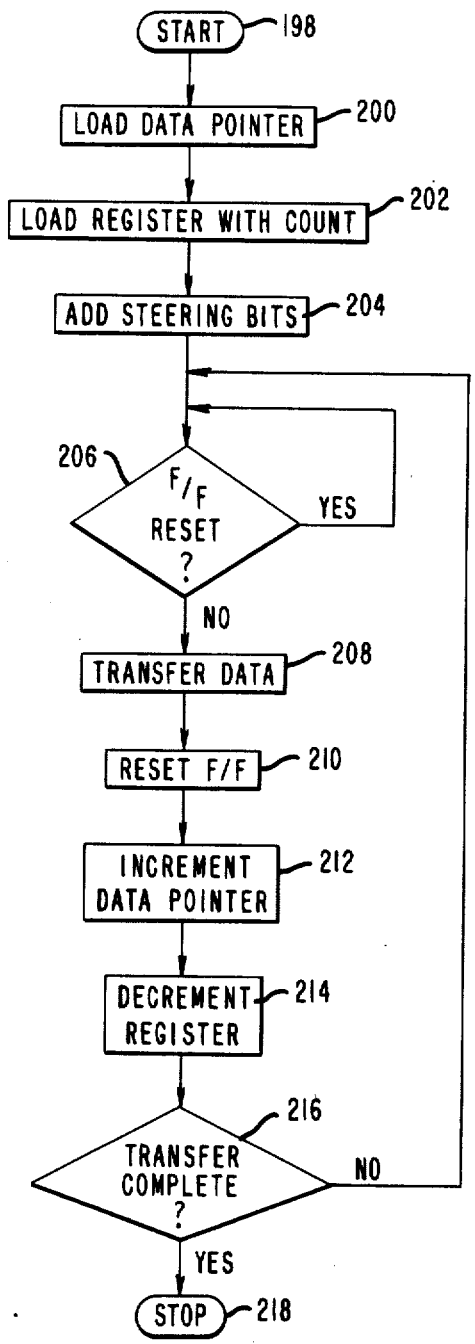
FIG. 8 is a flow chart of the operation of the receiving processor in a transmission of data between two processors employing the present invention.

If at this time, the microprocessor 32 has data to send to the microprocessor 30, the procedure set out in FIGS. 7 and 8 is repeated with the microprocessor 32 transferring data to the latch member 74 (FIGS. 3 and 6) and setting the flip-flop circuit 77, which enables the microprocessor 30 to transfer the data from the latch member 74 to the RAM memory unit 52. It will be seen that the data is transferred between the RAM memory unit associated with each of the microprocessors 30 and 32, which transfer is transparent to the microprocessors themselves allowing the transfer to occur at a high rate of speed.

While the principles of the invention have now been made clear in the illustrated embodiment, it will be obvious to those skilled in the art that many modifications in structure, arrangement, elements and components can be made which are particularly adapted for specific environments and operation requirements without departing from these principles. The appended claims are therefore intended to cover and embrace any such modification, within the limits only of the true spirit and scope of the invention.

We claim:

1. A data processing system for transferring data between remote storage members each associated with a data processor comprising:

a first latch member;

a second latch member;

a first remote storage member coupled to said first latch member for storing data transmitted between the first latch member and the first storage member;

a first processing device coupled to said first and second latch members and said first remote storage member for directly outputting first control signals simultaneously to said first storage member and said first and second latch members enabling data stored in said first storage member to be stored in said first latch member and to enable data stored in said second latch member to be stored in said first storage member;

a second remote storage member coupled to said second latch member for storing data transmitted between the second latch member and the second storage member;

a second processing device coupled to said first and second latch members and said second remote storage member for directly outputting second control signals simultaneously to said second storage member and said first and second latch members enabling data stored in said first latch member to be stored in said second remote storage member and enabling data stored in said second storage member to be stored in said second latch member;

a first bistable device coupled to said first and second processing devices for receiving said first and second control signals, said first bistable device outputting a first enabling signal to said second processing device in response to said first processing device outputting said first control signals to said first storage means and said first latch member enabling data stored in said first storage member to be stored in said first latch member, said first enabling signal enabling said second processing device to output said second control signals to said first latch member, said first bistable device and said second storage member enabling the data stored in said first latch member to be stored in said second storage member whereby said first bistable device outputs a second enabling signal to said first processing device in response to receiving said second control signals thereby enabling said first processing device to output said first control signals enabling data stored in said first storage member to be stored in said first latch member;

a second bistable device coupled to said first and second processing devices for outputting a third enabling signal to said first processing device in response to said second processing device outputting said second control signals to said second storage member and said second latch member enabling data in said second storage member to be stored in said second latch member, said second enabling signal enabling said first processing device to output said first control signals to said second latch member and said first storage member enabling the data stored in said second latch member to be stored in said first storage member whereby said second bistable device outputs a fourth enabling signal to said second processing device in response to said first processing device outputting said first control signals thereby enabling said second processing device to output said second control signals to said second storage member and said second latch member enabling data stored in said second storage member to be stored in said second latch member; and a third storage member located in said first processing device for storing said first control signals, said first control signals including first address signals representing the location in the first latch member in which is to be stored the data outputted by said first storage member, said processing system further including first decoding means coupled to said third storage member and said first bistable device for outputting a fifth control signal to said first bistable device in response to receiving said first address signals thereby enabling said first bistable device to output said first enabling signal.

2. The data processing system of claim 1 in which said second processing device includes a fourth storage member for storing second address signals representing the location in said second storage member for storing the data outputted by said first processing device and stored in said first latch member, said second address signals being outputted by said second processing device, and second decoding means coupled to said fourth storage member and said first latch member for outputting a sixth control signal to said first latch member in response to receiving said second address signals enabling said first latch member to output the stored data to said second storage member.

3. The data processing system of claim 2 which further includes gate means connected to said first bistable device and said second decoding means whereby said gate means outputs said sixth control signal to said first bistable device enabling the first bistable device to output said first control signal to said first processing device.

4. The data processing system of claim 3 in which said second processing device outputs a seventh control signal indicating the type of processing operation the second processing device is conducting, said second decoding means including logic circuit means receiving said seventh control signal and said second address signals for outputting said sixth control signal.

* * * * *